(12) United States Patent
Nakanishi et al.

(10) Patent No.: US 11,130,702 B2
(45) Date of Patent: Sep. 28, 2021

(54) OPTICAL FIBER MANUFACTURING METHOD

(71) Applicant: SUMITOMO ELECTRIC INDUSTRIES, LTD., Osaka (JP)

(72) Inventors: Tetsuya Nakanishi, Osaka (JP); Takuji Nagashima, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 332 days.

(21) Appl. No.: 16/364,494

(22) Filed: Mar. 26, 2019

(65) Prior Publication Data

US 2019/0300420 A1 Oct. 3, 2019

(30) Foreign Application Priority Data

Mar. 28, 2018 (JP) .............................. JP2018-061332

(51) Int. Cl.
*C03B 37/012* (2006.01)
*C03B 37/027* (2006.01)

(52) U.S. Cl.
CPC .. *C03B 37/01222* (2013.01); *C03B 37/01282* (2013.01); *C03B 37/027* (2013.01)

(58) Field of Classification Search
None
See application file for complete search history.

(56) References Cited

U.S. PATENT DOCUMENTS

| | | | |
|---|---|---|---|
| 2010/0000260 A1 | 1/2010 | Sandoz et al. | |
| 2011/0132038 A1* | 6/2011 | Dawes | C03B 37/01282 65/408 |
| 2018/0002217 A1* | 1/2018 | Boughton | C03B 37/01217 |

* cited by examiner

*Primary Examiner* — Lisa L Herring
(74) *Attorney, Agent, or Firm* — Faegre Drinker Biddle & Reath LLP

(57) ABSTRACT

Provided is an optical fiber manufacturing method that uses a low-cost large optical fiber preform having high precision. The optical fiber manufacturing method includes at least a positioning step of positioning core rods in a hollow carbon pipe that contains carbon as a main component, a soot preform preparation step of filling a gap between the carbon pipe and the core rods with silica powder that contains $SiO_2$ as a main component, thereby producing a soot preform, a consolidating step of introducing the soot preform into a furnace and consolidating the silica powder, thereby producing a transparent intermediate preform from the soot preform, an extraction step of extracting the transparent intermediate preform from the carbon pipe, and a drawing step of drawing the transparent intermediate preform, thereby manufacturing an optical fiber.

8 Claims, 10 Drawing Sheets

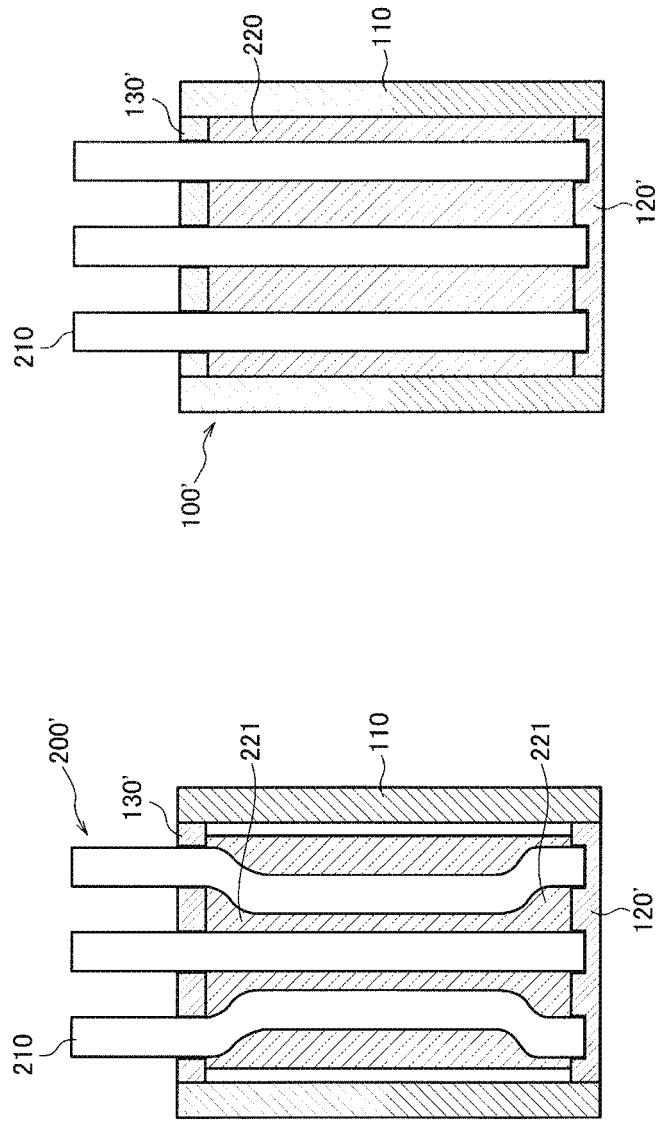

OPTICAL FIBER MANUFACTURING METHOD

BACKGROUND OF THE INVENTION

1. Field of the Invention

The present disclosure relates to an optical fiber manufacturing method suitable for the manufacture of multicore optical fibers.

2. Description of the Related Art

A multicore optical fiber that includes a plurality of cores extending in common cladding in an axial direction is capable of transmitting signal light through each of the plurality of cores; therefore, it is possible to transmit a large amount of information. A method of manufacturing a multicore-optical-fiber preform is, for example, the rod-in-tube method or the sand cladding method.

U.S. Patent Application Publication No. US2010/0000260A discloses the sand cladding method as a method of manufacturing a multicore-optical-fiber preform; in the method, a soot preform is produced by fixing core rods at predetermined positions in a glass pipe and then introducing silica powder into a gap between the glass pipe and the core rods. In addition, a method of consolidating this soot preform into an optical fiber preform and a method of drawing the soot preform while consolidating the soot preform that is directly subjected to a drawing step are disclosed. The sand cladding method is suitable as a method of manufacturing a multicore optical fiber because it is possible to arrange cores at desired positions in a soot preform.

SUMMARY OF THE INVENTION

An object of the present disclosure is to provide an optical fiber manufacturing method in which a large and high-precision soot preform can be used in the sand cladding method.

To solve the problem, provided is an optical fiber manufacturing method comprising a positioning step of positioning one or a plurality of core rods inside a carbon pipe, a soot preform preparation step of producing a soot preform by filling a gap between the carbon pipe and the one or the plurality of core rods with silica powder, a consolidating step of introducing the soot preform into a furnace and consolidating the silica powder, thereby producing a transparent intermediate preform, an extraction step of extracting the transparent intermediate preform from inside the carbon pipe, and a drawing step of drawing the transparent intermediate preform, thereby manufacturing an optical fiber.

In the optical fiber manufacturing method according to the present disclosure, the one or the plurality of core rods may be a plurality of core rods. Moreover, the positioning step may include a step of setting a first positioning plate on one end side of the carbon pipe, the first positioning plate having a positioning recess for fixing the one or the plurality of core rods and a step of setting a second positioning plate on another end side of the carbon pipe and fixing the one or the plurality of core rods by using the first positioning plate and the second positioning plate, the second positioning plate having a silica powder filling aperture and a positioning aperture that is for fixing the one or the plurality of core rods, and the soot preform preparation step may include a step of introducing the silica powder into the gap between the carbon pipe and the one or the plurality of core rods through the silica powder filling aperture.

In the optical fiber manufacturing method according to the present disclosure, one or both of the first positioning plate and the second positioning plate may be formed of a material that contains carbon as a main component, and the method may include, before the consolidating step, a step of detaching, out of the first positioning plate and the second positioning plate, at least one of plates formed of a material that contains carbon as a main component. Otherwise, one or both of the first positioning plate and the second positioning plate may be formed of a material that contains silica as a main component, and the consolidating step may be a step of obtaining the transparent intermediate preform that is integrated with, out of the first positioning plate and the second positioning plate, a plate or plates formed of a material that contains silica as a main component.

In addition, the optical fiber manufacturing method according to the present disclosure may further include a silica removal step of setting the carbon pipe inside a furnace into which a gas constituted by fluorine-containing molecules is introduced and removing adhered $SiO_2$ particles, and the carbon pipe may be reused.

The present disclosure enables a repeated use of a mold in the sand cladding method. Moreover, it becomes possible to manufacture an optical fiber in which a large and high-precision soot preform is used.

BRIEF DESCRIPTION OF THE DRAWINGS

FIGS. 7A and 7B are schematic views for describing the consolidating step of a second embodiment of the optical fiber manufacturing method according to the present disclosure.

DESCRIPTION OF THE PREFERRED EMBODIMENTS

In the method disclosed in US2010/0000260A, a glass pipe is used to prepare a soot preform. To obtain a large soot preform, a glass pipe that has a large diameter is required. Thickness of a large glass pipe relative to the diameter thereof is thin. The large glass pipe thus has difficulty in maintaining its structure to be highly precise and, consequently, curves in the longitudinal direction; therefore, it is difficult for the large glass pipe to have a sectional shape of a perfect circle. Moreover, large-diameter glass pipes are generally extremely expensive. Accordingly, it is difficult in the method disclosed in US2010/0000260A to obtain a soot preform that is excellent in terms of precision and cost effectiveness.

Hereinafter, suitable embodiments of the optical fiber manufacturing method according to the present disclosure will be described with reference to the drawings. In the following description, components having identical symbols in different drawings should be considered identical, and description thereof is omitted in some cases. Note that the present disclosure is not limited to the examples presented in these embodiments and includes every change within the range of the matters described in the claims and within a range equivalent thereto. Provided that it is possible to combine a plurality of embodiments together, the present disclosure includes a combination of any of the embodiments. In the following description, a method of manufacturing a multicore optical fiber will be described as an example; however, the present disclosure is also applicable to a method of manufacturing an optical fiber that includes only one core.

First Embodiment

Figure 1:
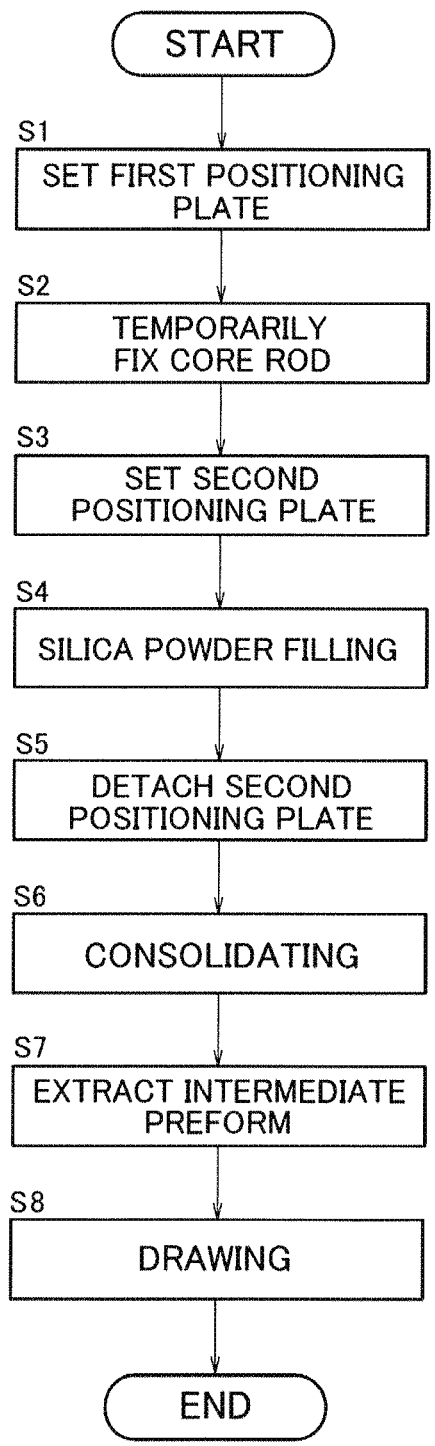
FIG. 1 is a flow chart of a first embodiment of an optical fiber manufacturing method according to the present disclosure.
Figure 2:
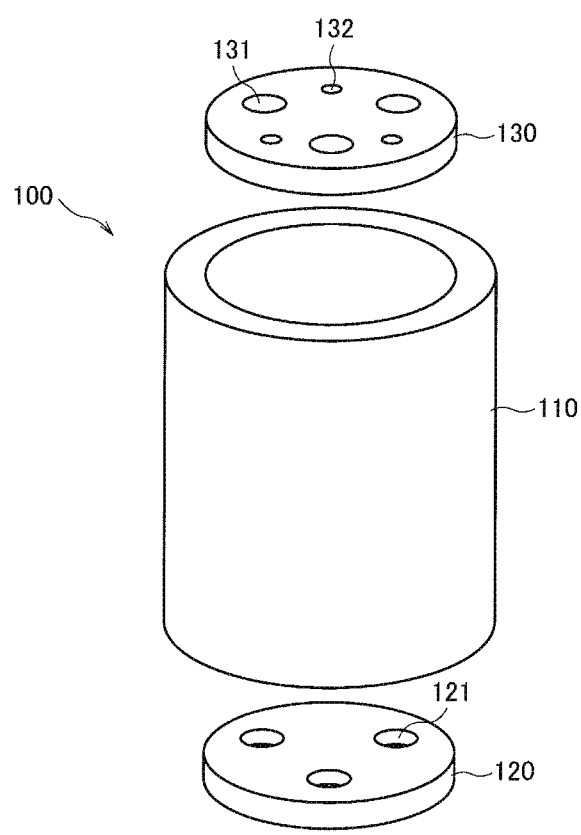
FIG. 2 is a perspective view illustrating a state before the assembly of a mold to be used in the first embodiment of the optical fiber manufacturing method according to the present disclosure.

FIG. 1 is a flow chart of a first embodiment of an optical fiber manufacturing method according to the present disclosure. FIG. 2 is a perspective view illustrating a state before the assembly of a mold 100 to be used in the first embodiment of the optical fiber manufacturing method according to the present disclosure. The mold 100 includes a hollow carbon pipe 110 that contains carbon as a main component, a disc-shaped first positioning plate 120 that is made of carbon and that is to be set at one end portion of the carbon pipe 110, and a disc-shaped second positioning plate 130 that is made of carbon and that is to be set at the other end portion of the carbon pipe 110. Carbon powder and a binder are used as materials to prepare the carbon pipe 110, and it is easy for the carbon pipe 110 to have a large and high-precision shape so as to be usable in a furnace tube of a large induction furnace. The first positioning plate 120 has bottomed positioning recesses 121 at predetermined positions in an upper surface thereof in accordance with the number of core rods 210. The second positioning plate 130 has positioning apertures 131, which are through holes having a diameter substantially equal to the diameter of each core rod 210, in accordance with the number of core rods 210 and has filling apertures 132, which are for placing a silica powder 220 into the carbon pipe 110, at appropriate positions.

To produce an optical fiber preform, a positioning step is first performed. In the first embodiment, the positioning step includes a step S1 of setting the first positioning plate 120 on one end side of the carbon pipe 110, a step S2 of temporarily fixing the core rods inside the carbon pipe 110, and a step S3 of setting the second positioning plate 130 on the other end side of the carbon pipe 110.

In the step S1, the first positioning plate 120 is set on the one end side of the carbon pipe 110. The carbon pipe 110 and the first positioning plate 120 may be fixed to each other by, for example, both being slightly tapered and mechanically fitted to each other. Moreover, the carbon pipe 110 and the first positioning plate 120 may be separated from each other before being reused after an optical fiber preform is prepared, or the carbon pipe 110 and the first positioning plate 120 may remain fixed to each other.

In the step S2, one end portion of each core rod 210 is inserted into a corresponding one of the positioning recesses 121 of the first positioning plate 120, and the core rods 210 are temporarily fixed inside the carbon pipe 110. In this case, a cylinder axis of the carbon pipe 110 is desirably directed in the vertical direction, and the carbon pipe 110 is arranged such that the one end portion thereof is positioned on the lower side in the vertical direction. Rods that are longer than the carbon pipe 110 are used as the core rods 210. The core rods 210 are manufacturable by a known vapor-phase glass synthesis method, such as vapor axial deposition (VAD), outside vapor deposition (OVD), modified chemical vapor deposition (MCVD), and plasma-activated chemical vapor deposition (PCVD). The core rods 210 may each include, in addition to a portion that serves as a core, a portion that serves as an innermost layer of cladding.

In the step S3, the second positioning plate 130 is set on the other end side (the upper end side in the first embodiment) of the carbon pipe 110 in a state in which the core rods 210 that are temporarily fixed to the first positioning plate 120 are inserted into the positioning apertures 131 of the second positioning plate 130. The positioning recesses 121 of the first positioning plate 120 and the positioning apertures 131 of the second positioning plate 130 corresponding thereto are arranged so as to be at identical positions as viewed in the direction of the cylinder axis of the carbon pipe 110. The second positioning plate 130 is fixed so as to be easily detachable from the carbon pipe 110 because of later detachment thereof from the carbon pipe 110. The core rods 210 are fixed stably to the carbon pipe 110 by the first positioning plate 120 and the second positioning plate 130. Consequently, it is possible to arrange and position the core rods freely and highly precisely inside a jacket that serves as the cladding, which enables a soot preform in which the plurality of core rods 210 are arranged with high precision to be obtained at low cost.

Next, a soot preform preparation step is performed. In the first embodiment, the soot preform preparation step includes a step S4 of filling with silica powder and a step S5 of detaching the second positioning plate.

Figure 3A:
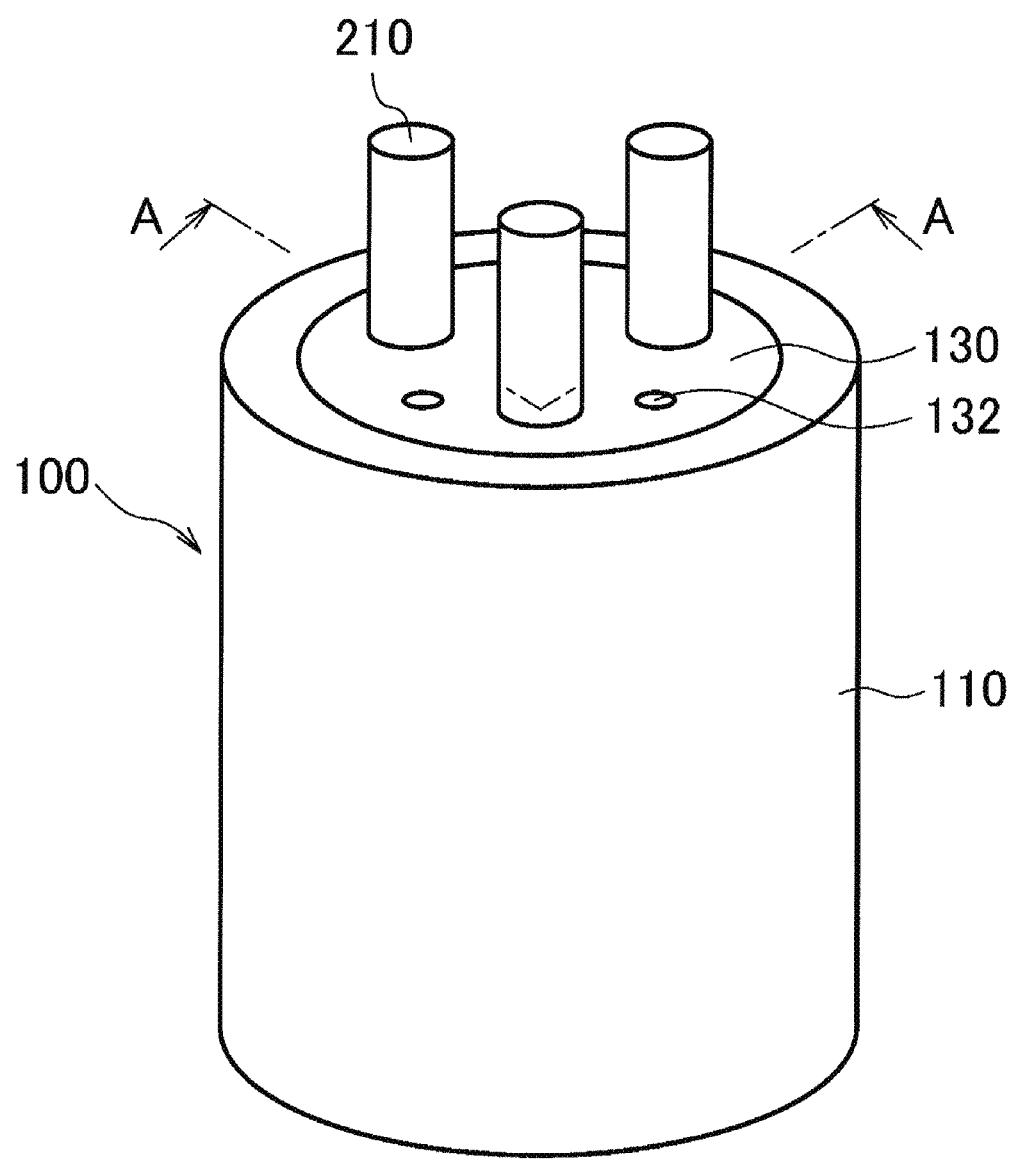
FIG. 3A is a perspective view illustrating a state in which core rods are positioned in the mold illustrated in FIG. 2 and the mold is filled with silica powder.
Figure 3B:
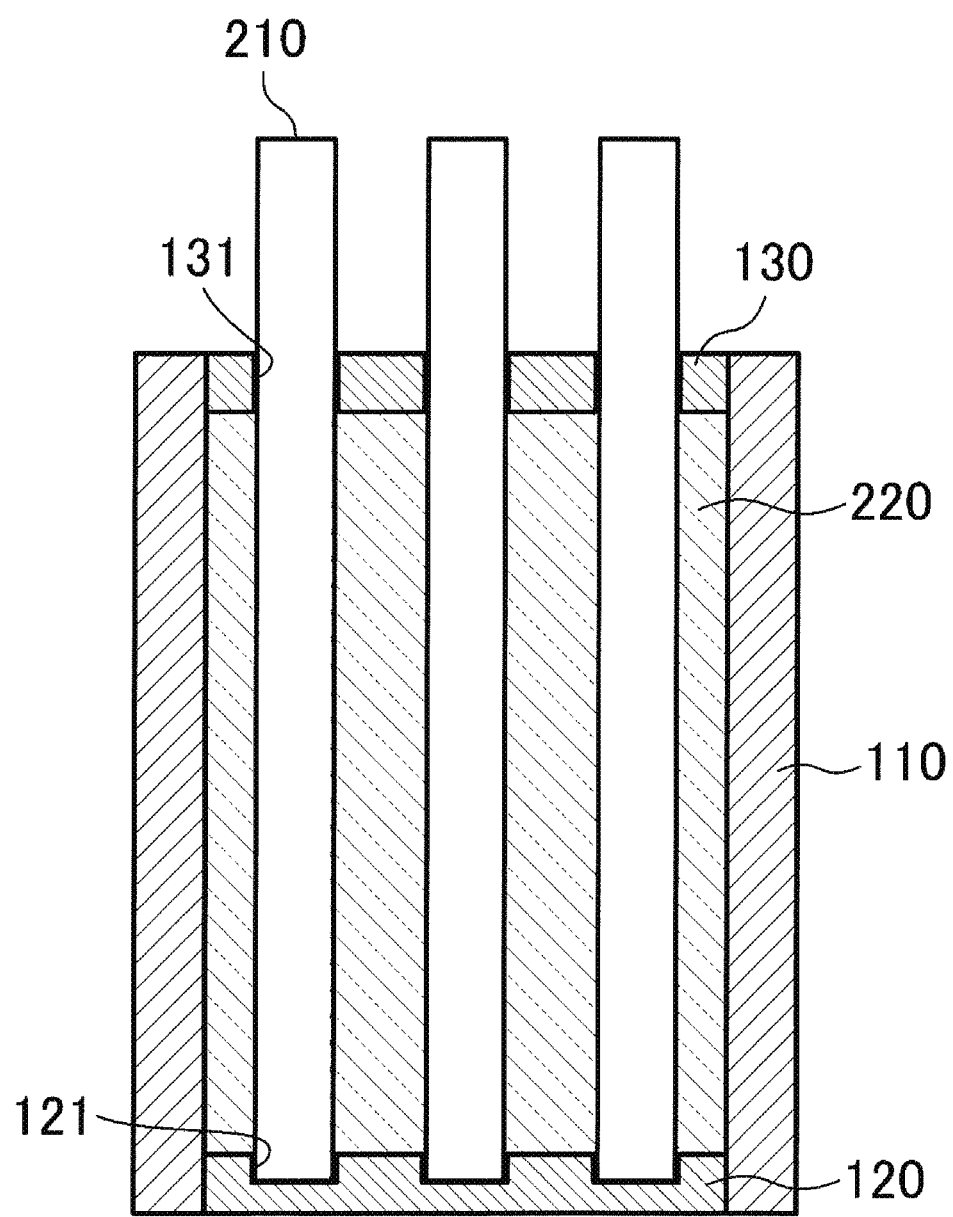
FIG. 3B is a sectional view of the mold in FIG. 3A taken along line A-A.

FIG. 3A is a perspective view illustrating a state in which the core rods 210 are positioned in the mold 100 and the mold 100 is filled with the silica powder 220. FIG. 3B is a sectional view of the mold in FIG. 3A taken along line A-A. In the step S4, the silica powder 220 is introduced through the filling apertures 132 of the second positioning plate 130 to fill a gap between the carbon pipe 110 and the core rods 210 to thereby form a soot preform. The silica powder 220 constitutes cladding of an optical fiber. The silica powder 220 is not limited to silica glass containing $SiO_2$ as a main component and may be silica glass to which a small amount of a dopant is added. The silica powder is preferably high-purity synthetic silica glass and preferably has an average particle diameter in the range from 10 nm to 1 µm. The silica powder may be directly used for the filling; however, from a point of view of fluidity and filling density, granulated powder that is obtained by granulating the silica powder in a granulator with a binder added thereto and that has a large average particle diameter may be used. If a binder is used, the silica powder is preferably consolidated after being subjected to an appropriate degreasing step.

Figure 4A:
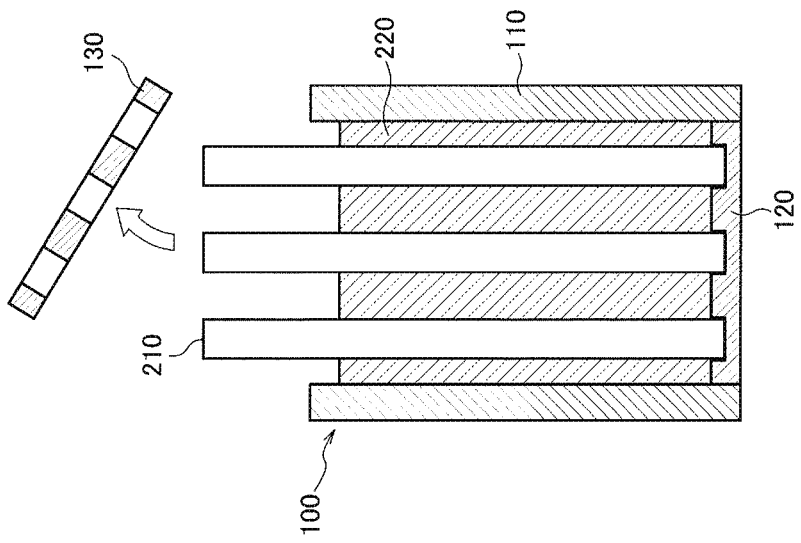
FIGS. 4A, 4B, and 4C are schematic views for describing, respectively, detaching of a second positioning plate, a consolidating step, and an extraction step of the first embodiment of the optical fiber manufacturing method according to the present disclosure.

FIG. 4A is a schematic view illustrating the step S5 of detaching the second positioning plate from the mold 100. In the first embodiment, it is an issue whether a transparent intermediate preform 200 that is obtained by consolidating the soot preform is efficiently separated from the carbon pipe 110, the first positioning plate 120, and the second positioning plate 130. It is possible to perform consolidating while maintaining the first positioning plate 120 and the second positioning plate 130 to be set; however, the silica powder 220 shrinks during the process of consolidating, and the core rods 210 softened at a consolidating temperature thus curve in accordance with the shrinkage. Therefore, it becomes difficult to detach the core rods 210 after consolidating from the first positioning plate 120 and the second positioning plate 130.

Here, the first positioning plate 120 is not preferably detached when the carbon pipe 110 is arranged in the vertical direction because, if the first positioning plate 120 is detached before consolidating, the silica powder 220 that fills the inside of the carbon pipe 110 may drop. In contrast, as for the second positioning plate 130, even when the second positioning plate 130 is detached, it is possible to maintain the positions of the core rods 210 if the silica powder 220 is introduced and the core rods 210 are in a state of being fixed by the silica powder 220. Consequently, absence of the second positioning plate 130 enables the transparent intermediate preform 200 to be detached easily after consolidating.

Figure 4B:
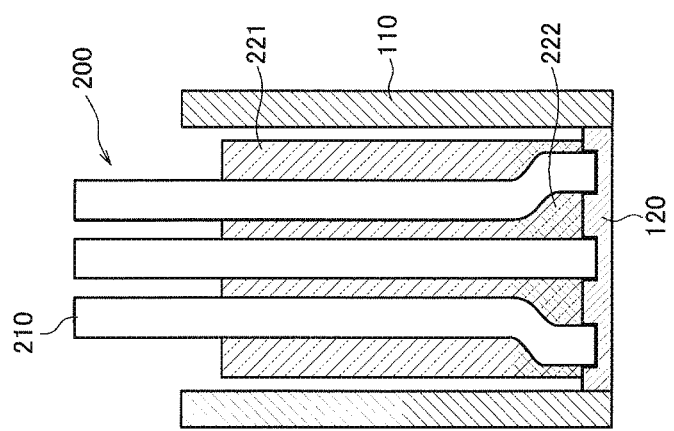
Figure 4C:
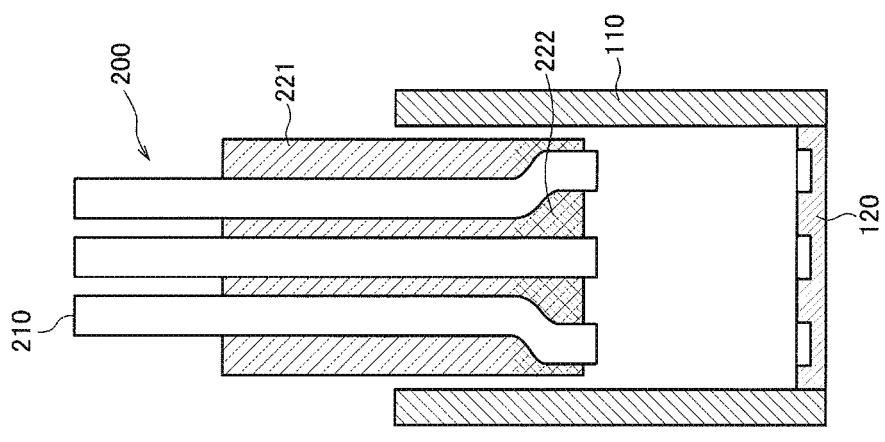

FIG. 4B is a schematic view for describing the consolidating step (step S6) of the first embodiment of the optical fiber manufacturing method according to the present disclosure. In the step S6, the mold 100 from which the second positioning plate 130 is detached is introduced into a furnace (not illustrated), and a soot preform is consolidated. A gap is formed between the carbon pipe 110 and the transparent intermediate preform 200 as a result of the soot preform being placed in the furnace and the silica powder 220 being consolidated and consequently shrinking. FIG. 4C is a schematic view for describing an extraction step (step S7) of the first embodiment of the optical fiber manufacturing method according to the present disclosure. In the step S7, the transparent intermediate preform 200 is extracted from the carbon pipe 110.

A muffle made of quartz or made of carbon may be used as a muffle (partition wall) of the furnace used in the consolidating step. To remove impurities adhering to the silica powder 220, the consolidating step may be combined, as appropriate, with an impurity removing method that is practicable by a person skilled in the art, such as a dehydrating step in which a halogen gas, for example, chlorine is made to flow. To bring such a gas for removing impurities into contact with the silica powder 220 inside the soot preform, the carbon pipe 110 or the first positioning plate 120 may be provided with a gas inlet that enables halogen gas to be introduced, as appropriate, therethrough.

As described above, because the silica powder 220 shrinks during the process of consolidating, the core rods 210 softened at the consolidating temperature curve in accordance with the shrinkage, and it becomes difficult to detach the core rods 210 from the first positioning plate 120. Therefore, the silica powder 220 that is positioned at a certain distance from the first positioning plate 120 is not heated to a degree that causes the silica powder 220 to shrink in the furnace so as to be maintained in an unconsolidated state, which suppresses shrinkage of the core rods 210 in the vicinity of the first positioning plate 120. Consequently, it is possible to extract the transparent intermediate preform 200 easily from the first positioning plate 120. In FIGS. 4B and 4C, a consolidated portion of the silica powder 220 is illustrated as a consolidated body 221, and an unconsolidated portion of the silica powder 220 is illustrated as an unconsolidated body 222. The consolidated body 221 serves as a cladding material of an optical fiber preform 240 illustrated in FIG. 5.

Figure 5:
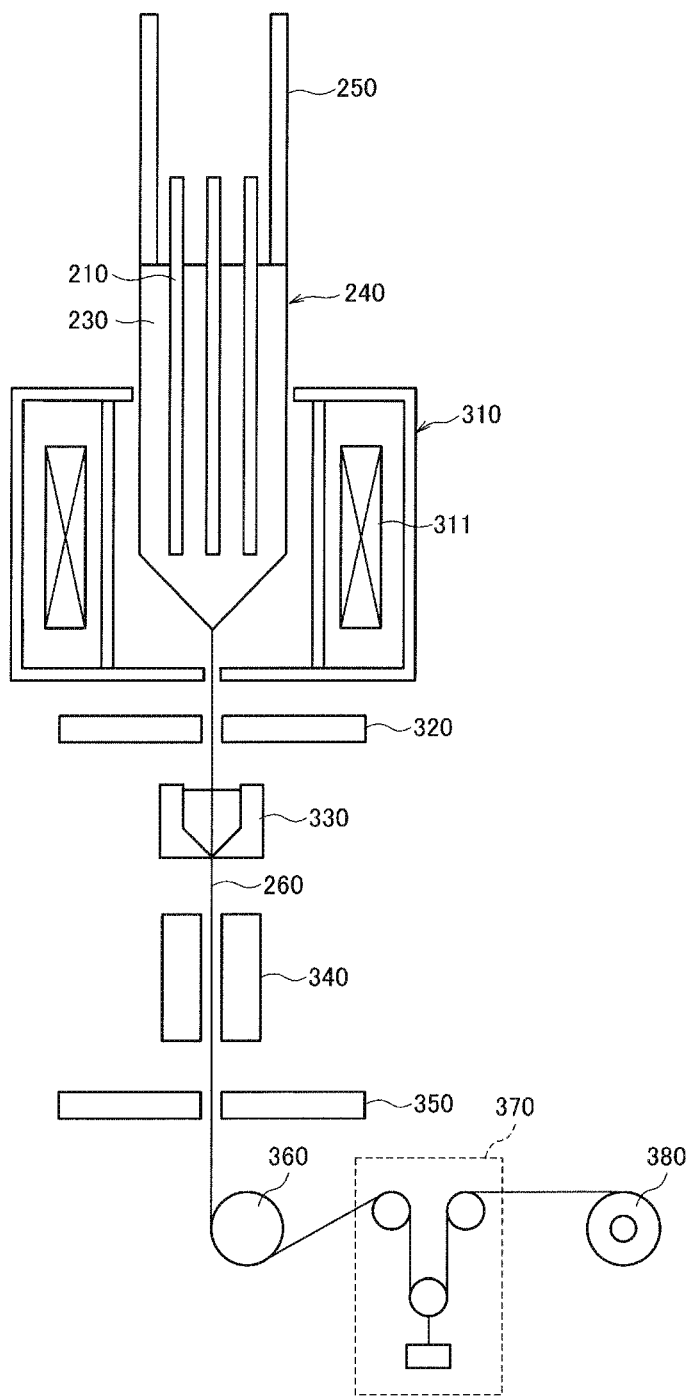
FIG. 5 is a schematic view for describing a drawing step of the first embodiment of the optical fiber manufacturing method according to the present disclosure.

FIG. 5 is a schematic view for describing a drawing step (step S8) of the first embodiment of the optical fiber manufacturing method according to the present disclosure. The optical fiber preform 240 is held by a suspension device (not illustrated) via a handling pipe 250 fixed to one end portion thereof and is gradually inserted from a tip end portion thereof into a drawing furnace 310 provided with a heater 311.

The optical fiber preform 240 is constituted by the plurality of core rods 210 and a cladding material 230 provided around the core rods 210 and is formed by shaping, as appropriate, the transparent intermediate preform 200 into a spinnable shape. A clean gas atmosphere is maintained inside the drawing furnace 310. When a tip of the optical fiber preform 240 softens and drops due to its own weight, an optical fiber 260 starts to be taken up under the drawing furnace 310. An advancing direction of the optical fiber 260 is changed by a guide roller 360, and the optical fiber 260 is taken up around a take-up bobbin 380 in a state in which predetermined tension is applied to the optical fiber 260 by a proof testing machine 370. A diameter monitor 320 is set directly under the drawing furnace 310. The outer diameter of the optical fiber 260 is measured by the diameter monitor 320, and a take-up speed of the optical fiber 260 and a feed speed of the optical fiber preform 240 are controlled so that the optical fiber 260 has a predetermined diameter.

The silica glass-based optical fiber 260 is greatly decreased due to surface flaw; therefore, the surface is coated with a resin immediately after wire drawing so as to be protected. Generally, two or more coating layers are desirably provided on the optical fiber 260. For example, a primary coating layer that suppresses an external force from being applied directly to the optical fiber 260 as a result of contact with a bare fiber and a secondary coating layer that suppresses external damage are provided as coating layers. Thus, a resin is applied on the optical fiber 260 by a coating dice 330 configured to apply each resin layer, and the applied resin is cured by a UV lamp 340 (ultraviolet curing furnace). The outer diameter of the optical fiber 260 to which the resin has been applied is measured by the diameter monitor 350, and the thickness of the coating layers is controlled by controlling the amount of resin used for coating.

The carbon pipe 110 containing carbon as a main component, the first positioning plate 120, and the second positioning plate 130 are reusable. However, portion of the silica remains in a state of being welded and adheres to an inner wall of the carbon pipe 110 after the transparent intermediate preform 200 is extracted. Accordingly, if the carbon pipe 110 in the state is reused, the transparent intermediate preform 200 produced through the consolidating step and the adhering residual silica are welded together, which makes it difficult to extract the transparent intermediate preform 200 from the carbon pipe 110. Thus, the residual silica adhering to an inner surface of the carbon pipe 110 is desirably removed before the carbon pipe 110 is reused. Consequently, it becomes possible to extract the transparent intermediate preform 200 smoothly from the carbon pipe 110 in the extraction step.

Figure 6:
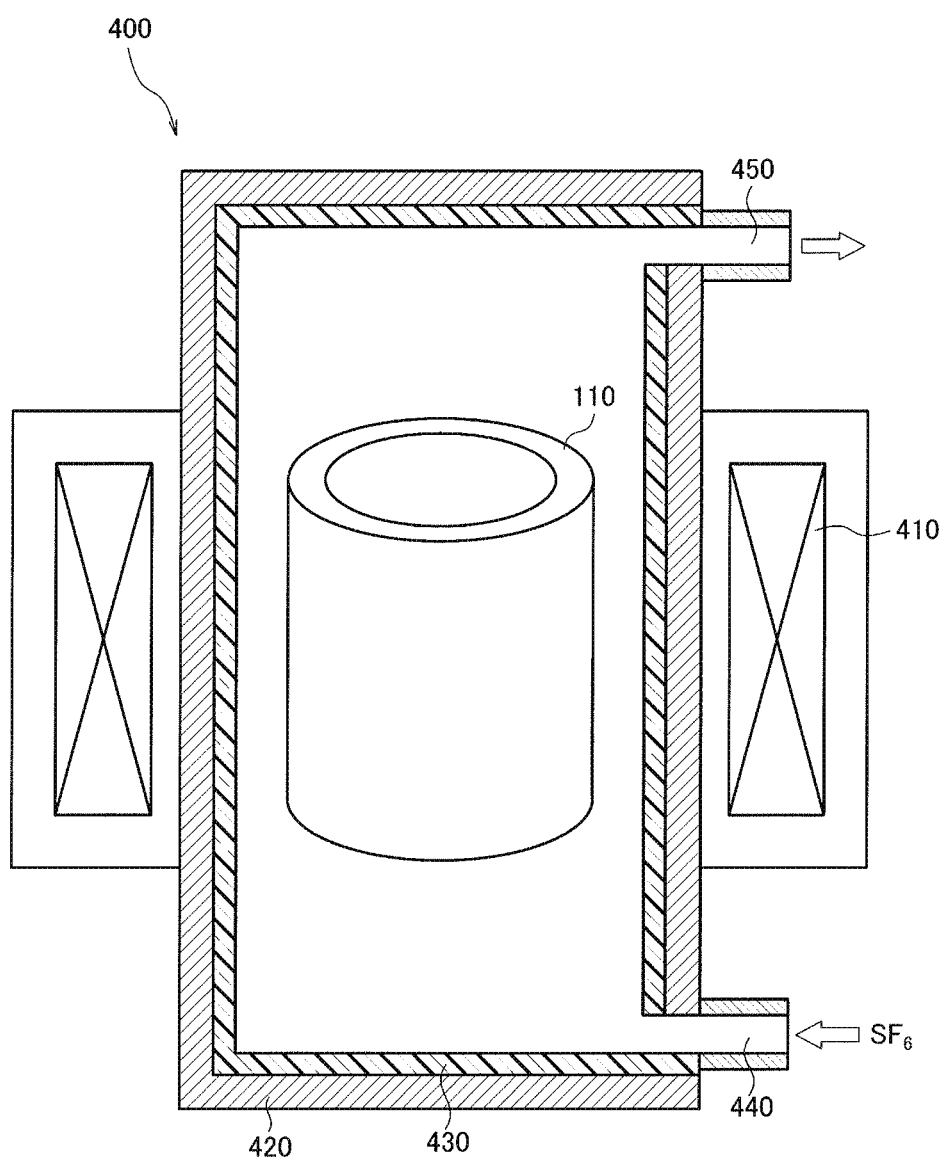
FIG. 6 is a schematic view of a furnace to be used in a silica removal step of the first embodiment of the optical fiber manufacturing method according to the present disclosure.

FIG. 6 is a view of a furnace to be used in a silica removal step for the carbon pipe 110 used in the optical fiber manufacturing method of the embodiment according to the present disclosure. To remove the residual silica adhering to the inner surface of the carbon pipe 110, the used carbon pipe 110 is placed in a furnace 400 into which a gas constituted by fluorine-containing molecules is introduced, and the carbon pipe 110 is treated at a high temperature. The furnace 400 includes a heater 410 for heating and a muffle 420. The furnace 400 has a gas inlet 440 and a gas outlet 450. For example, $SF_6$ is suitably usable as a gas to be introduced through the gas inlet 440.

If the muffle 420 is made of glass containing $SiO_2$ as a main component, the muffle 420 is eroded by fluorine gas; therefore, the muffle 420 is desirably made of carbon. Moreover, an inner surface of the muffle 420 is desirably coated with ceramic 430, which is non-reactive to fluorine. It is consequently possible for the inner surface of the carbon muffle 420 to maintain its high hermeticity, and it is thus possible to suppress leakage of noxious fluorine gas. Meanwhile, it is desirable that adhered silica be removed also from the first positioning plate 120 and the second positioning plate 130, similarly to the carbon pipe 110, through the silica removal step.

Second Embodiment

In a second embodiment, a first positioning plate 120' and a second positioning plate 130' are each constituted by a material containing silica as a main component. Steps of an optical fiber manufacturing method according to the second embodiment are substantially identical to the steps in the first embodiment. However, in the second embodiment, the step S5 of detaching the second positioning plate is not essential, and the structure of a transparent intermediate preform 200' that is prepared in the consolidating step differs from that in the first embodiment.

FIGS. 7A and 7B are schematic views for describing the consolidating step according to the second embodiment of the optical fiber manufacturing method according to the present disclosure. The core rods 210 are positioned in the carbon pipe 110 by using the first positioning plate 120' and the second positioning plate 130', and a mold 100' in a state in which a gap between the carbon pipe 110 and the core rods 210 is filled with the silica powder 220 is placed in a furnace (not illustrated) and heated to a temperature at which the silica powder 220 is consolidated (FIG. 7A). Consequently, the silica powder 220 of a soot preform is consolidated and shrinks, and the transparent intermediate preform 200' in which the first positioning plate 120', the second positioning plate 130', the consolidated body 221 obtained by consolidating the silica powder 220, and the core rods 210 are integrated together is thereby obtained. As a result, a gap is formed between the carbon pipe 110 and the consolidated transparent intermediate preform 200 (FIG. 7B). In the second embodiment, it is possible to heat, without keeping a low temperature in the vicinity of the first positioning plate 120', the silica powder 220 such that an entire portion of the silica powder 220 is consolidated, which enables the temperature of the furnace to be easily controlled in the consolidating step.

Figure 7C:
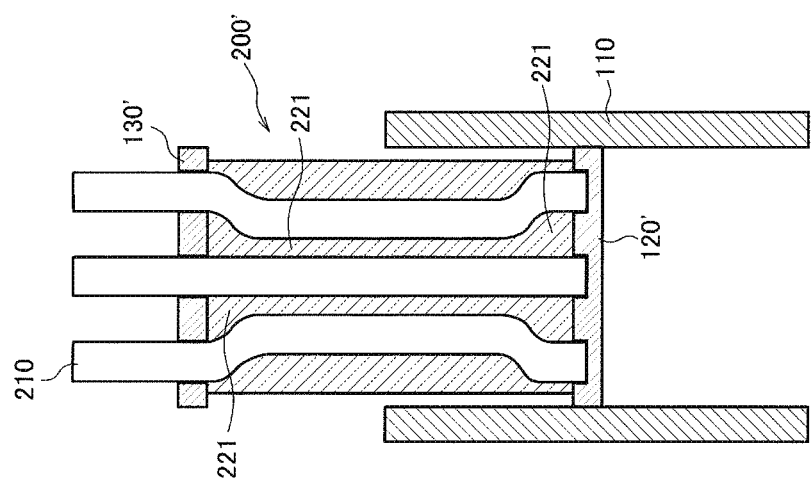
FIG. 7C is a schematic view for describing the extraction step.

FIG. 7C is a schematic view for describing an extraction step of the second embodiment of the optical fiber manufacturing method according to the present disclosure. The transparent intermediate preform 200' is extracted from the carbon pipe 110 and used in the drawing step after being shaped, as necessary. In the second embodiment, the first positioning plate 120' and the second positioning plate 130' are extracted from the carbon pipe 110 in the extraction step, and therefore, it is desirable to set the first positioning plate 120' and the second positioning plate 130' in the carbon pipe 110 so as to be attached in a form and with strength that enable subsequent extraction thereof to be performed easily. Moreover, similarly to the first embodiment, in the second embodiment, the second positioning plate 130' may be detached before the consolidating step.

While suitable embodiments of the present disclosure are described above, the embodiments may be combined together. For example, the first positioning plate 120 made of carbon and the second positioning plate 130' made of silica are used together. In this case, consolidating is performed without detaching the second positioning plate 130' before the consolidating step, and, in the consolidating step, temperature control is performed such that the silica powder is in an unconsolidated state in the vicinity of the first positioning plate 120 made of carbon. In addition, for example, the first positioning plate 120' made of silica and the second positioning plate 130 made of carbon may be used together. In this case, the second positioning plate 130 is detached before the consolidating step, and, in the consolidating step, consolidating is performed such that the entire silica powder 220 is formed into the consolidated body 221.

REFERENCE SIGNS LIST 100, 100' mold, 110 carbon pipe, 120, 120' first positioning plate, 121 positioning recess, 130, 130' second positioning plate, 131 positioning aperture, 132 filling aperture, 200, 200' transparent intermediate preform, 210 core rod, 220 silica powder, 221 consolidated body, 222 unconsolidated body, 230 cladding material, 240 optical fiber preform, 250 handling pipe, 260 optical fiber, 310 drawing furnace, 311, 410 heater, 320, 350 diameter monitor, 330 coating die, 340 UV-lamp, 360 guide roller, 370 proof testing machine, 380 take-up bobbin, 400 furnace, 420 muffle, 430 ceramic, 440 gas inlet, 450 gas outlet

What is claimed is:

1. An optical fiber manufacturing method comprising:
a positioning step of positioning one or a plurality of core rods inside a carbon pipe;
a soot preform preparation step of producing a soot preform by filling a gap between the carbon pipe and the one or the plurality of core rods with silica powder;
a consolidating step of introducing the soot preform into a furnace and consolidating the silica powder, thereby producing a transparent intermediate preform, the transparent intermediate preform being the soot preform that is made transparent;
an extraction step of extracting the transparent intermediate preform from inside the carbon pipe; and
a drawing step of drawing the transparent intermediate preform, thereby manufacturing an optical fiber.

2. The optical fiber manufacturing method according to claim 1,
wherein the one or the plurality of core rods are a plurality of core rods.

3. The optical fiber manufacturing method according to claim 1,
wherein the positioning step includes a step of setting a first positioning plate on one end side of the carbon pipe, the first positioning plate having a positioning recess for fixing the one or the plurality of core rods, and a step of setting a second positioning plate on another end side of the carbon pipe and fixing the one or the plurality of core rods by using the first positioning plate and the second positioning plate, the second positioning plate having a silica powder filling aperture and a positioning aperture that is for fixing the one or the plurality of core rods, and wherein the soot preform preparation step includes a step of introducing the silica powder into the gap between the carbon pipe and the one or the plurality of core rods through the silica powder filling aperture.

4. The optical fiber manufacturing method according to claim 3, wherein one of the first positioning plate and the second positioning plate is formed of a material that contains carbon as a main component, and wherein the method includes, before the consolidating step, a step of detaching the one of the first positioning plate and the second positioning plate that is formed of the material that contains carbon as the main component.

5. The optical fiber manufacturing method according to claim 3, wherein one of the first positioning plate and the second positioning plate is formed of a material that contains silica as a main component, and wherein the consolidating step is a step of obtaining the transparent intermediate preform that is integrated with the one of the first positioning plate and the second positioning plate that is formed of the material that contains silica as the main component.

6. The optical fiber manufacturing method according to claim 1, further comprising a silica removal step of setting the carbon pipe inside a furnace into which a gas constituted by fluorine-containing molecules is introduced and removing adhered $SiO_2$ particles, wherein the carbon pipe is reused.

7. The optical fiber manufacturing method according to claim 3, wherein both of the first positioning plate and the second positioning plate are formed of a material that contains carbon as a main component, and wherein the method includes, before the consolidating step, a step of detaching at least one of the first positioning plate and the second positioning plate.

8. The optical fiber manufacturing method according to claim 3, wherein both of the first positioning plate and the second positioning plate are formed of a material that contains silica as a main component, and wherein the consolidating step is a step of obtaining the transparent intermediate preform that is integrated with both the first positioning plate and the second positioning plate.

* * * * *